(No Model.)

G. W. RAYMOND.
DITCHING MACHINE.

No. 292,355. Patented Jan. 22, 1884.

Attest:
F. H. Schott

Inventor:
George W. Raymond

UNITED STATES PATENT OFFICE.

GEORGE W. RAYMOND, OF SENECA, ILLINOIS.

DITCHING-MACHINE.

SPECIFICATION forming part of Letters Patent No. 292,355, dated January 22, 1884.

Application filed September 18, 1883. (No model.)

*To all whom it may concern:*

Be it known that I, GEORGE W. RAYMOND, a citizen of the United States, residing at Seneca, in the county of La Salle and State of Illinois, have invented certain new and useful Improvements in Ditching-Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in ditching-machines; and it consists in the peculiar construction and arrangement of parts, as will be hereinafter more fully set forth and claimed.

Figure 1:
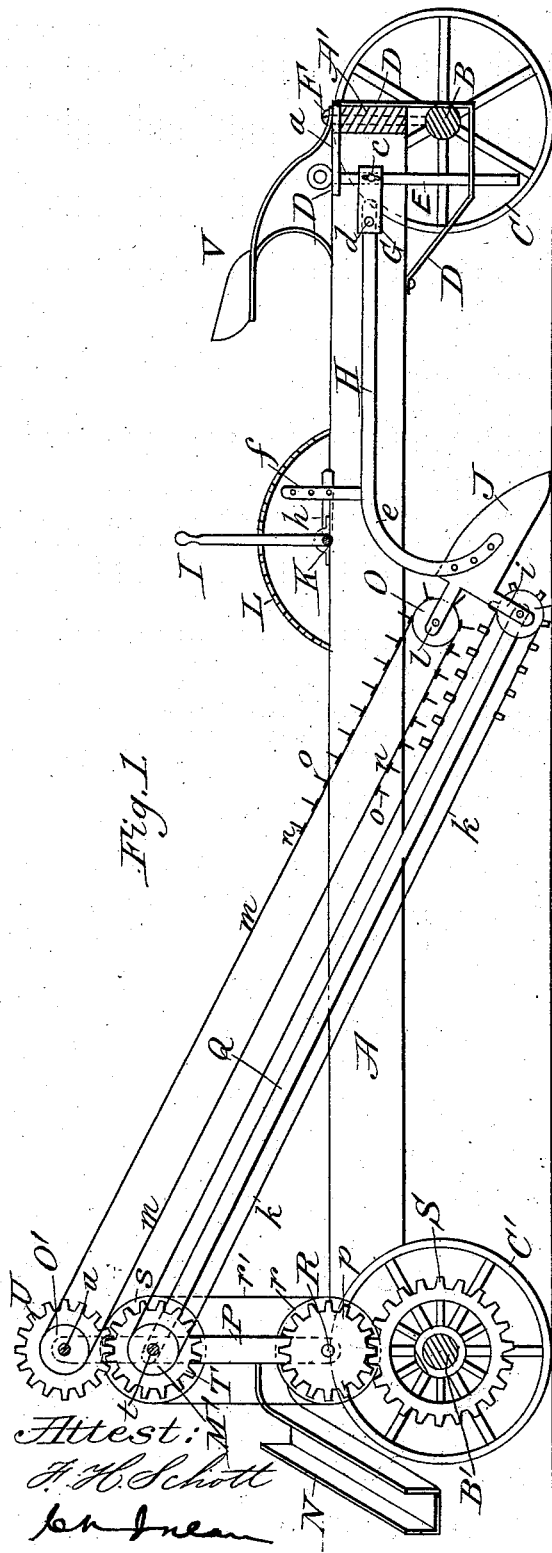
Figure 2:
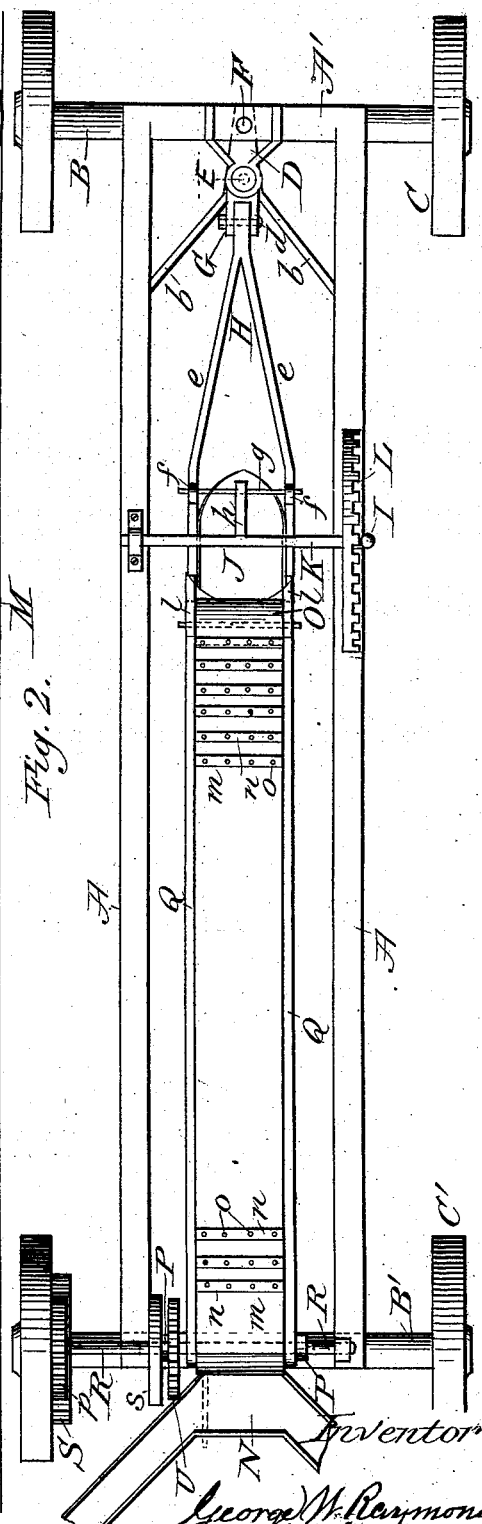

In the annexed drawings, Figure 1 is a longitudinal sectional view of my improved ditcher. Fig. 2 is a plan view of the same.

The letter A represents the body or frame, of the machine, which is made of wood, and rests on the axles B B″. The axles are provided with wheels C C′, as shown.

D represents an iron frame-work or brace, which is secured to the under side of the frame, near its center, and passes around and in front of the front axle, B, upward, and is bent over the cross-piece A′ of the frame, forming a projection or support, a, for the draft-pin E. The brace D is provided below the frame with two arms, b b, which diverge to each side, and are bolted to the under sides of the frames or side pieces, A, as shown.

F is the king-bolt that passes through the cross-piece A′, frame-work or brace D, and axle B, and connects them securely together. The draft-pin E plays or is swiveled in the frame-work D, passing through a hole in the part a, and also one in the lower part of the frame-work just in front of the arms b b.

G is a knuckle-piece, having an eye through which the draft-pin E passes. This knuckle is adjustable on the draft-pin, and when in position is held there by a set-screw, c.

Letter H represents the plow-beam, connected to the fork of the knuckle-piece G by a pin, d, which allows the beam to be raised and lowered by means of a lever, I. The beam H is provided or spread with two arms, e e, which curve downward, and are fastened to either side of the plow J. These arms e e are made of steel, and are elastic and capable of being spread, so that plows of different widths may be used. The plow J is scoop-shaped or concave in form and diamond pointed, with the bottom at or near the point slightly curved upward, as shown in Fig. 1. The arms e e have attached to or cast on them two uprights or lugs, f f, through which passes a rod, g. To this rod g is secured an arm, h, which is attached at its other end to a rock-shaft, K, extending across the machine transversely, and journaled in suitable boxes on the side pieces, A A, as shown in Fig. 2. To one end of this shaft K is attached the lever I, which works in a ratchet-arc, L, thus holding the plow at any desired height. Arms i i are attached to each side of the plow or scoop J, and carry between them a pulley, M, over which passes an endless-belt earth-conveyer, k. This conveyer is nearly as wide as the plow, and serves to carry off the soil from the plow and convey it to the dump or chute N, at the rear of the machine. A pulley, O, is journaled between two arms, l l, that are fastened to the sides of the plow. This pulley O is placed a proper distance above the pulley M, and carries a conveyer, m. The conveyer k has riveted to its edges thin pieces of copper or steel about two inches wide and at short distances apart, their purpose being to prevent the dirt from falling off at the sides of the belt. Slats placed crosswise on the conveyer k are not used for the reason that a scraper is to be adjusted to clean the conveyer when the soil is muddy. Over pulley O passes belt-conveyer m, of the same width as conveyer k, and traveling parallel with and a short distance above conveyer k. Cross slats n n are placed on this conveyer m, through which slats run vertical spring steel tines o o, the object of which tines is to seize upon chunks, sods, and hard clods and assist in carrying them up the conveyer k. The belts or conveyers k and m pass over pulleys M′ and O′, respectively, which are placed or journaled in a pulley-frame, P, at the rear of the machine, as seen in Fig. 1.

The letter Q represents two bars of iron or wood, one on each side of conveyer k, and connecting the plow J and pulley-frame P, and serving to keep the conveyers taut. The pulley-frame P consists of two upright arms pivoted on a shaft, R, which extends transversely across the rear of the machine and above the rear axle, B'. The pulley-frame swings back and forth on the shaft R, to respond to the action of the lever I when raising or lowering the plow. The dump N is inclined, and so formed with a double chute as to throw the dirt on both sides of the ditch made by the plow; or the dump may be arranged to throw the soil on either side of the ditch by means of an adjustable partition.

S is the driving wheel or gear, firmly bolted to the left hind tread-wheel, C', that engages with a fixed pinion, $p$, on the shaft R. A fixed pulley, $r$, on the shaft R transmits motion by means of a belt or link-chain, $r'$, to a pulley, $s$, on a shaft, $t$, journaled in the pulley-frame P. A pinion or gear, T, on the shaft $t$ meshes with a gear-wheel, U, on a shaft, $u$, above. The pulleys O' and M', which are keyed to the shafts $u$ and $t$, respectively, are thus caused to rotate and drive the belts or conveyers $k$ and $m$. To the front of the machine is attached a spring-seat, V, for use of the driver, who has control of the lever I.

In operating the machine the conveyers $k$ and $m$, which carry off the soil as it is cut by the plow, are raised and forced backward by means of the bars Q Q at the same time that the plow J is raised by means of the lever I, and vice versa.

Having thus described my invention, what I claim as new, and desire to secure by Letters Patent, is—

1. In a ditching-machine, the combination, with the adjustable plow J, having bifurcated beam H, of the conveyers $k\ m$, adjustable knuckle G, and draft-pin E, substantially as described.

2. In a ditching-machine, the combination, with the adjustable plow J, of the conveyers $m\ k$, side bars, Q Q, pulley-frame P, swiveled on the shaft R, and suitable connecting and operating mechanism, substantially as described.

3. In a ditching-machine, the combination, with the frame A A' and frame-work D, of the draft-pin E, knuckle-piece G, plow-beam H, having arms $e\ e$ and uprights $f\ f$, rod $g$, arm $h$, secured to said rod and to rock-shaft K, lever I, ratchet-arc L, plow J, conveyers $k\ m$, pulleys O O' and M M', pulley-frame P, dump N, gears U T, pulleys $s\ r$, belt $r'$, pinion $p$, and driving-gear S, substantially as shown and described.

In testimony whereof I affix my signature in presence of two witnesses.

GEORGE W. RAYMOND.

Witnesses:
 THOS. C. FULLERTON,
 ISAAC DEGENE.